(12) United States Patent
Heilman

(10) Patent No.: US 11,485,513 B2
(45) Date of Patent: Nov. 1, 2022

(54) FUEL PUMP OVERRIDE CONTROL METHOD

(71) Applicant: Parker-Hannifin Corporation, Cleveland, OH (US)

(72) Inventor: William B. Heilman, Brunswick, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 658 days.

(21) Appl. No.: 16/525,002

(22) Filed: Jul. 29, 2019

(65) Prior Publication Data

US 2020/0164999 A1 May 28, 2020

Related U.S. Application Data

(60) Provisional application No. 62/780,989, filed on Dec. 18, 2018, provisional application No. 62/741,695, filed on Oct. 5, 2018.

(51) Int. Cl.
*B64D 37/10* (2006.01)
*B64D 37/04* (2006.01)
*B64D 37/08* (2006.01)

(52) U.S. Cl.
CPC ............ *B64D 37/10* (2013.01); *B64D 37/04* (2013.01); *B64D 37/08* (2013.01)

(58) Field of Classification Search
CPC ......... B64D 37/10; B64D 37/20; B64D 37/28
See application file for complete search history.

(56) References Cited

U.S. PATENT DOCUMENTS

| | | | |
|---|---|---|---|
| 2,759,424 A | 8/1956 | Defibaugh et al. | |
| 2,840,097 A * | 6/1958 | Farkas | B64D 37/005 137/98 |
| 6,913,228 B2 | 7/2005 | Lee et al. | |
| 8,666,632 B2 | 3/2014 | Zebrowski et al. | |
| 2003/0218098 A1* | 11/2003 | Goto | B64D 37/28 244/135 R |
| 2016/0146117 A1* | 5/2016 | Swann | F02C 9/46 60/39.19 |
| 2016/0169112 A1* | 6/2016 | Morioka | F02C 7/222 60/735 |
| 2018/0050812 A1* | 2/2018 | Ribarov | F02C 7/236 |
| 2018/0065756 A1* | 3/2018 | Cirioli | F02M 37/10 |

* cited by examiner

*Primary Examiner* — Timothy D Collins
*Assistant Examiner* — Justin Michael Heston
(74) *Attorney, Agent, or Firm* — Renner, Otto, Boisselle & Sklar, LLP

(57) ABSTRACT

A system and method of controlling a fuel system on an aircraft includes selectively supplying fuel from either a main fuel tank or at least one wing fuel tank to a fuel consumer by varying a speed of at least one main fuel tank pump associated with the main fuel tank relative to a speed of at least one wing fuel tank pump associated with the at least one wing fuel tank.

20 Claims, 3 Drawing Sheets

FUEL PUMP OVERRIDE CONTROL METHOD

TECHNICAL FIELD

The present application relates generally to fuel systems and, more particularly, to an aircraft fuel system and method for controlling a pump of an aircraft fuel system.

BACKGROUND INFORMATION

Aircraft fuel systems can be designed in many ways. In larger aircraft the fuel is stored in tanks located both in the wings and in the center fuselage. Each wing typically includes two electric motor driven fuel pumps that supply fuel to the engine on the same side of the plane. Depending upon the operating condition, one or both wing fuel tank pumps can be operational at the same time. The center fuel tank usually has two electric motor driven fuel pumps that also supply fuel to the engines; one pump for each engine. The center fuel tank pumps are connected by a cross feed valve in the event one center fuel tank pump fails and the remaining center fuel tank pump needs to feed fuel to both engines.

Normal aircraft operating procedures require fuel from the center fuel tank to be used before the fuel in the wing fuel tanks. After the center fuel tank is depleted, the center fuel tank pumps are turned off and the fuel from the wing tanks is delivered to the engines. The wing fuel tank and center fuel tank pumps are both operational during most phases of flight (unless they are turned off per operating procedure), so a key issue is how to deplete fuel from the center fuel tank before the wing fuel tanks. Conventionally, this is accomplished by using pumps having different performance characteristics. For example, the discharge pressure of the center fuel tank pump may be greater than the discharge pressure of the wing fuel tank pumps. Thereby, the center fuel tank pump overrides the wing fuel tank pump.

To maintain override when the center fuel tank pumps are operating at points where the flow is large, and the pressure is low, a Pressure Regulating Valve (PRV) is added on the discharge side of the wing fuel tank pump. This valve opens at a pressure lower than the discharge pressure of the center fuel tank pump and recirculates the fuel from the wing fuel tank back into the tank, instead of delivering it to the engine. When the center fuel tank is depleted of fuel and the pump is turned off, the regulating valve closes and allows fuel from the wing fuel tank to be delivered to the engine.

SUMMARY OF THE INVENTION

Recent fuel systems have adopted the idea of using identical pumps for the wing tank and center tank positions. This approach allows a single pump part number to be purchased and requires less inventory of spare parts. However, this approach presents a unique problem for maintaining fuel delivery from the center fuel tank pump as the primary path, with delivery of fuel from the wing fuel tank pumps occurring only after the center tank is empty. With similar discharge pressure versus flow curves for both pumps, the tendency will be for fuel to be delivered from both tanks simultaneously.

A device and method in accordance with the present invention simplify aircraft fuel system architecture, resulting in fewer components and thus reducing weight and system cost. In accordance with the invention, the speed of the wing fuel tank pumps and the speed of the center fuel tank pumps are controlled such that, under certain operating conditions, the pressure supplied from the center fuel tank pumps is higher than the pressure supplied from the wing fuel tank pumps. In this manner, the center fuel tank pump will override the wing fuel tank pumps and fuel delivery will be from the center tank until the center tank is depleted, without the need for a PRV.

According to one aspect of the invention, a method of controlling a fuel system on an aircraft, includes: selectively supplying fuel from either a center fuel tank or at least one wing fuel tank to a fuel consumer by varying a speed of at least one main fuel tank pump associated with the main fuel tank relative to a speed of at least one wing fuel tank pump associated with the at least one wing fuel tank.

Optionally, the at least one main fuel tank pump and the at least one wing tank fuel pump are fluidically coupled to the same fuel consumer through a common fuel line, and selection of fuel from the main fuel tank or the at least one wing fuel tank is based on a fluid pressure created by the respective fuel tank pumps, the pressure created by each fuel tank pump corresponding to a speed of the respective fuel tank pump.

Optionally, selectively supplying fuel comprises operating the at least one main fuel tank pump at a speed that is less than a speed of the at least one wing fuel tank pump while the aircraft is below a threshold altitude.

Optionally, selectively supplying fuel comprises operating the at least one main fuel tank pump at a speed that is greater than a speed of the at least one wing fuel tank pump while the aircraft is above a threshold altitude.

Optionally, selectively supplying fuel comprises operating the at least one main fuel tank pump at a speed that is greater than a speed of the at least one wing fuel tank pump, thereby providing fuel from the main fuel tank to the fuel consumer until the fuel in the main fuel tank is depleted.

Optionally, the method includes stopping the at least one main fuel tank pump upon the fuel in the main tank being depleted.

Optionally, selectively supplying fuel comprises operating the at least one main fuel tank pump at a speed that is less than a speed of the at least one wing fuel tank pump, thereby providing fuel from the at least one wing fuel tank to the fuel consumer.

According to another aspect of the invention, an aircraft fuel system includes: a main fuel tank including at least one main fuel tank pump; a first wing fuel tank including at least one first wing fuel tank pump; and a controller operably coupled to the at least one main fuel tank pump and the at least one first fuel tank pump, the controller configured to vary a speed of the at least one main fuel tank pump relative to a speed of the at least one first wing fuel tank pump to selectively supply fuel from either the main fuel tank or the first wing fuel tank to at least one fuel consumer.

Optionally, the at least one main fuel tank pump and the at least one first wing fuel tank pump are fluidically coupled to the same fuel consumer through a common fuel line, wherein selection of fuel from the main fuel tank or the at least one wing fuel tank is based on a fluid pressure created by the respective fuel tank pumps, the pressure created by each fuel tank pump corresponding to a speed of the respective fuel tank pump.

Optionally, the at least one main fuel tank pump and the at least one first wing fuel tank pump are fluidically coupled to the same fuel consumer through a common fuel line, and fuel is supplied from the main tank to the fuel consumer when the speed of the at least one main fuel tank pump is greater than a speed of the at least one first wing fuel tank pump, and fuel is supplied from the first wing fuel tank to the fuel consumer when the speed of the at least one first wing fuel tank pump is greater than a speed of the at least one main wing fuel tank pump.

Optionally, the at least one main fuel tank pump and the at least one first wing fuel tank pump comprise a pump having the same specifications.

Optionally, the at least one main fuel tank pump and the first wing fuel tank pump each have the same physical dimensions and the same performance characteristics.

Optionally, the at least one fuel consumer comprises a first fuel consumer and a second fuel consumer, further comprising a first fuel line coupling the at least one main fuel tank pump and the at least one first wing fuel tank pump to the first fuel consumer, and a second fuel line coupling the at least one main fuel tank pump and the at least one second wing fuel tank pump to the second fuel consumer.

Optionally, the at least one main fuel tank pump comprises a first main fuel tank pump and a second main fuel tank pump, further comprising a cross-feed valve fluidically coupling the first main fuel tank pump to the second main fuel tank pump.

Optionally, the fuel consumer comprises a jet engine.

Optionally, the fuel consumer comprises an auxiliary power unit.

Optionally, the controller is configured to selectively provide fuel by operating the at least one main fuel tank pump at a speed that is less than a speed of the at least one first wing fuel tank pump while the aircraft is below a threshold altitude.

Optionally, the controller is configured to selectively supply fuel by operating the at least one main fuel tank pump at a speed that is greater than a speed of the at least one first wing fuel tank pump while the aircraft is above a threshold altitude.

Optionally, the controller is configured to selectively supply fuel by operating the at least one main fuel tank pump at a speed that is greater than a speed of the at least one first wing fuel tank pump, thereby providing fuel from the main fuel tank to the fuel consumer until the fuel in the main fuel tank is depleted.

Optionally, the controller is configured to stop the at least one main fuel tank pump upon the fuel in the main fuel tank being depleted.

Optionally, the controller is configured to selectively supply fuel by operating the at least one main fuel tank pump at a speed that is less than a speed of the at least one first wing fuel tank pump, thereby providing fuel from the wing fuel tanks to aircraft engines.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

The present invention will be described in the context of an aircraft fuel system. It will be appreciated, however, that the aspects of the invention can be used in other applications in which fuel delivery is shared by multiple fuel tanks with one fuel tank taking delivery priority over other fuel tanks.

Figure 1:
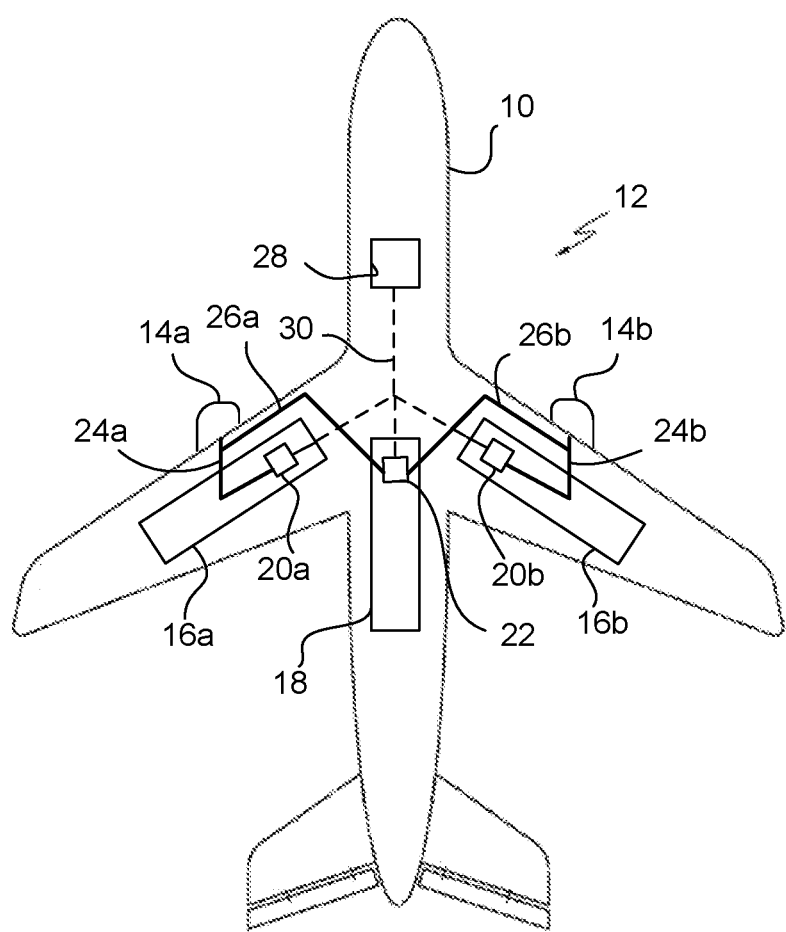
FIG. 1 is a schematic diagram of an aircraft having a fuel system with a center tank and two wing tanks.

Referring now in detail to the drawings and initially to FIG. 1, illustrated is an aircraft 10 that includes a fuel system 12 for delivering fuel to engines 14a, 14b, e.g., jet engines or the like (also referred to as fuel consumers). Although not shown in FIG. 1, the aircraft 10 may also include one or more auxiliary power units located in a tail section of the aircraft 10. The exemplary aircraft 10 has multiple fuel tanks, including wing tanks 16a, 16b and main (center) tank 18. The terms "main fuel tank" and "center fuel tank" may be used interchangeably, and refer to the same fuel tank, e.g., a primary fuel tank of the aircraft.

Each tank 16a, 16b, 18 includes at least one respective fuel pump 20a, 20b, or 22, operative to pump pressurized fuel from the respective tank to the engines 14a, 14b via fuel lines 24a, 24b, 26a, 26b. As can be seen, the fuel lines 24a, 24b, 26a, 26b fluidically couple the fuel tank pumps to one another and to the engines 14a, 14b. In one embodiment, the main fuel tank pump 22 and the wing fuel tank pumps 20a, 20b have the same specifications. For example, each pump has the same physical dimensions and the same performance characteristics (e.g., the same flow and pressure ratings for a given speed). Preferably, the fuel tank pumps are identical pumps.

A controller 28 is operatively coupled to each pump 20a, 20b, 22 via communication link 30 and operative to control the speed of each pump to produce a desired pressure in the respective lines 24a, 24b, 26a, 26b. More particularly, the controller 28 is configured to vary a speed of main fuel tank pump 22 relative to a speed of the wing fuel tank pumps 20a, 20b to selectively supply fuel from either the main fuel tank 18 or the first and second wing fuel tanks 16a, 16b to engines 14a, 14b. The controller 28 can be a single assembly that controls all aircraft fuel pumps and be remotely located relative to pumps 20a, 20b, and 22, and connected to the pumps via an electronic cable. Alternatively, multiple controllers 28 can be used to operate each pump assembly individually, where each controller may be contained within a respective pump assembly.

Figure 2:
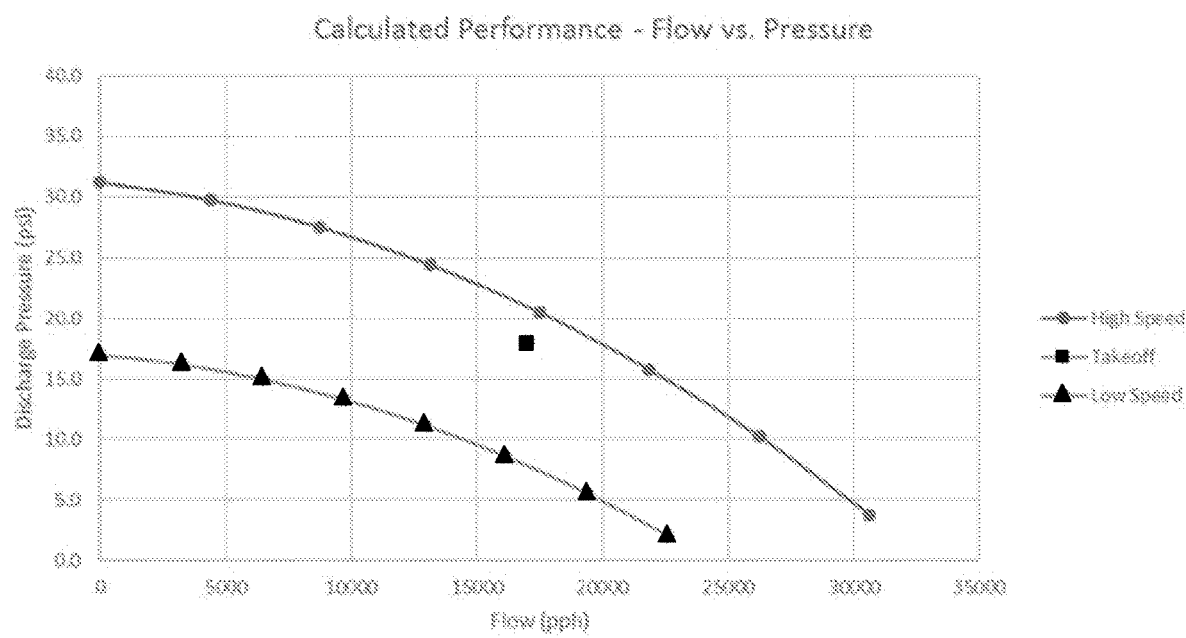
FIG. 2 is an illustration of a pump discharge pressure versus flow curve for high and low speed pump operation compared to the required performance for aircraft takeoff.

Referring briefly to FIG. 2, pump discharge pressure varies with pump speed. Higher pump speeds produce higher discharge pressure relative to lower pump speeds. Thus, by varying the speed of the respective pumps, the pressure output by each pump can be raised or lowered (depending on pump speed). As discussed in more detail, this pressure difference can advantageously be used to select fuel for delivery to the engine from one tank or another tank.

Figure 3:
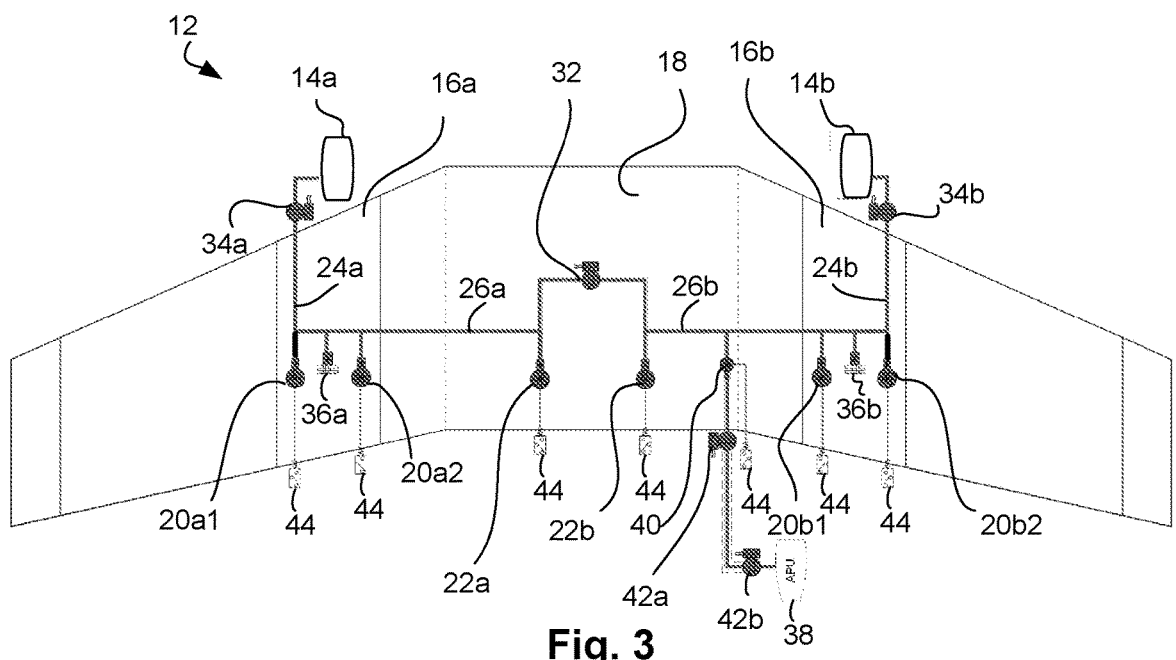
FIG. 3 is a simplified schematic of a fuel system in accordance with the invention for an aircraft having two main engines and an auxiliary power unit.

With additional reference to FIG. 3, further details of the aircraft fuel system 12 are illustrated. As shown, fuel lines 24a, 26a fluidically couple a first main fuel tank pump 22a to the wing fuel tank pumps 20a1, 20a2 and to the engine 14a, and fuel lines 24b, 26b fluidically couple a second main fuel tank pump 22b to the wing fuel tank pumps 20b1, 20b2 and to the engine 14b. Fuel lines 24a and 24b are common fuel lines between each fuel pump and at least one of the engines 14a, 14b. Fuel pumps 20a1 and 20a2 may be collectively referred to as pumps 20a, fuel pumps 20b1 and 20b2 may be collectively referred to as pumps 20b, and fuel pumps 22a and 22b may be collectively referred to as pumps 22.

A cross-feed valve 32 fluidically connects the first main fuel tank pump 22a to the second main fuel tank pump 22b and enables transfer of fuel between the main fuel tank 18 and the wing fuel tanks 16a, 16b to maintain balance as needed during operation of the aircraft 10. Additionally, the cross-feed valve 32 enables both engines to receive fuel from both wing tanks, if desired. Shutoff valves 34a, 34b couple fuel lines 24a, 24b to engines 14a, 14b, respectively, and enable fuel to be shut off from the respective engines 14a, 14b in the event of an engine fire or other engine malfunction. Further, inlet straining baskets 36a, 36b enable engines 14a, 14b to draw non-pressurized fuel from the tanks in the event of pump failure. An auxiliary power unit (APU) 38 receives fuel via pump 40 and shutoff valves 42a, 42b. Pressure switches 44 provide an indication to the controller 28 that each pump is producing sufficient pressure.

A control algorithm implemented by the controller 28 can be used to operate each of the pumps at two different speeds (and thus different pressure outputs) in a manner that allows for the use of identical pumps in the main and wing tanks while maintaining the main tank as overriding the wing tank. During takeoff and climb to five thousand feet standard procedure is for the main fuel tank pumps 22a, 22b to be turned off and the wing fuel tank pumps 20a1, 20a2, 20b1, 20b2 to feed the engines 14a, 14b. Therefore, during this phase of operation, the main fuel tank pumps 22a, 22b are turned off (zero speed) and the wing fuel tank pumps 20a1, 20a2, 20b1, 20b2 are operated on high speed (and thus output a high fluid pressure relative to the main fuel tank pump). Because the pressure output by the wing fuel tank pumps is greater than the pressure output by the main fuel tank pumps, the fuel is supplied from the wing fuel tank to the engines 14a, 14b.

When a predetermined altitude (e.g., five thousand feet) is reached, the main fuel tank pumps 22a, 22b are commanded on to high speed, thereby matching the performance curves of the wing tanks 20a1, 20a2, 20b1, 20b2 and flow is delivered from all fuel tanks 16a, 16b, 18 momentarily. After the main fuel tank pumps have reached full speed, the wing fuel tank pumps are commanded to the low speed setting (and thus output a lower fluid pressure relative to the main fuel tank pumps). When operated on the low speed settings, the maximum pressure the wing fuel tank pumps can produce at any flow is lower than the operating pressure of the main fuel tank pumps at the required operating condition, thereby ensuring that the main fuel tank pump will override the wing fuel tank pump and fuel delivery will be from the main tank until it is depleted, at which point the main fuel tank pump may be turned off.

Accordingly, by varying the speed of one pump relative to the other pump, fuel is selectively pumped from one of the main fuel tank or the wing fuel tank based on a fluid pressure created by the respective fuel tank pumps. This operating methodology of using two distinct speeds to control pump operation and subsequent fuel delivery allows for the elimination of the pressure regulating valve that previously was part of each wing fuel tank pump. Since less parts are used in the fuel system, this approach reduces cost to the aircraft manufacturer and increases the overall reliability of the fuel system.

Speed command can be incorporated on electric motor driven pumps that use brushless DC power systems by incorporating a single analog voltage signal to the electronic controller 28 that will command a predetermined speed output. Speed command can also be incorporated on induction AC motor driven pumps by incorporating a two-speed winding on the motor stator that is controlled by selectively powering the correct electrical pins on the pump's electrical connector. In addition, this method allows the utilization of identical fuel pumps for both main and wing fuel tank applications, which is beneficial for reducing development costs, recurring costs and life cycle costs for the fuel system.

Figure 4:
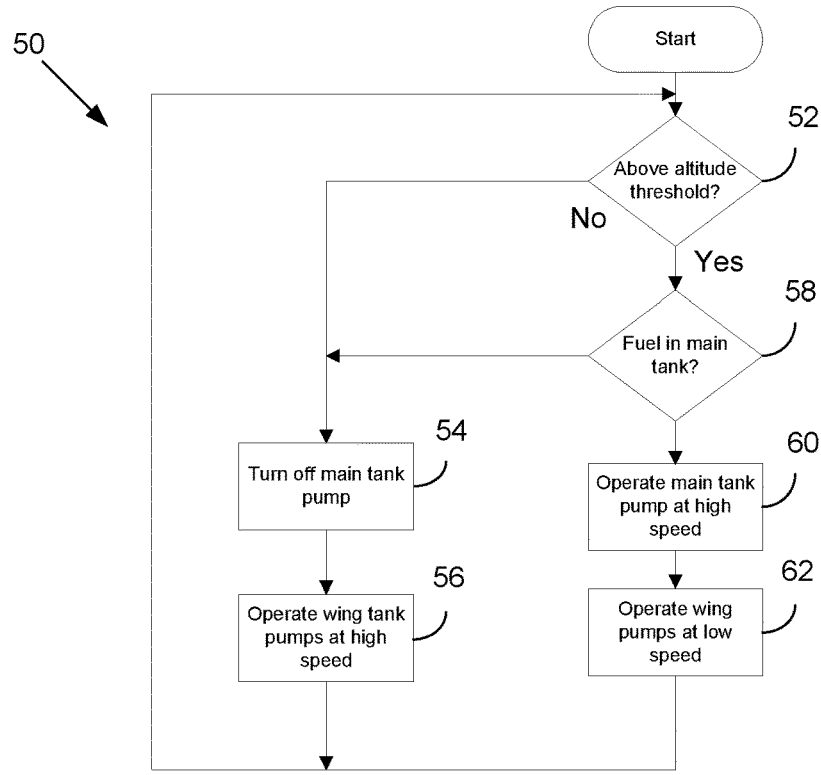
FIG. 4 is a flow diagram illustrating an exemplary method of controlling main and wing fuel tank pumps in accordance with the invention.

Moving now to FIG. 4, illustrated is an exemplary flow diagram 50 representative of a process that may be implemented using, for example, computer readable instructions that may be used to control fuel pumps of an aircraft. The exemplary process may be performed using a processor, a controller and/or any other suitable processing device. For example, the exemplary process may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Some or all of the exemplary process may be implemented using any combination(s) of application specific integrated circuit(s) (ASIC(s)), programmable logic device(s) (PLD(s)), field programmable logic device(s) (FPLD(s)), discrete logic, hardware, firmware, and so on. Further, the order of execution of the blocks may be changed, and/or some of the blocks described may be changed, eliminated, sub-divided, or combined. Additionally, any or all of the exemplary process may be performed sequentially and/or in parallel by, for example, separate processing threads, processors, devices, discrete logic, circuits, and so on.

The method 50 of FIG. 4 selectively supplies fuel from either a main (center) fuel tank or at least one wing fuel tank to a fuel consumer by varying a speed of at least one main fuel tank pump associated with the main fuel tank relative to a speed of at least one wing fuel tank pump associated with the at least one wing fuel tank. In this regard, since the main fuel tank pump and the wing tank fuel pump are fluidically coupled to the same fuel consumer through a common fuel line, selection of fuel from the main fuel tank or the at least one wing fuel tank is based on a fluid pressure created by the respective fuel tank pumps, where the pressure created by each fuel tank pump corresponds to a speed of the respective fuel tank pump.

Beginning at step 52, the controller 28 determines if the aircraft 10 is above a predetermined altitude, e.g., 5000 feet. Such determination may be made, for example, using sensors of the aircraft (e.g., an altimeter), where the sensor data is provided to the controller 28. If the aircraft 10 is not above the threshold altitude, then the method moves to steps 54 and 56 where the controller 28 commands the main fuel tank pump 22 to turn off and commands the one or more wing fuel tank pumps 20a, 20b to operate at a high-speed mode.

In this manner, the fuel supplied by the wing fuel tank pumps 20a, 20b will be at a high pressure relative to the fuel supplied by the main fuel tank pump 22, thus selecting fuel from the wing fuel tank 16a, 16b. The method then moves back to step 52 and repeats.

Moving back to step 52, if the aircraft 10 is above the threshold altitude the method then moves to step 58 where the controller determines if there is fuel in the main fuel tank 18. If the main fuel tank 18 is empty then the method moves to steps 54 and 56 where the controller commands the main fuel tank pump 22 to turn off and commands the wing fuel tank pumps 20a, 20b to operate at high speed as described above, and the method moves back to step 52. However, if at step 58 fuel is present in the main fuel tank 20, then the method moves to step 60 where the controller 28 commands the main fuel tank pump 22 to operate at high speed and at step 62 the controller 28 commands the wing fuel tank pumps 20a, 20b to operate at a low speed (i.e., lower than the speed of the main fuel tank pump).

The speed of the wing fuel tank pumps 20a, 20b may be set as a percentage of the speed of the main fuel tank pump 22. For example, the wing fuel tank pumps 20a, 20b may be set between 60 percent to 80 percent of the speed of the main fuel tank pump 22 depending upon the shape of the pump's performance curve.

As the main fuel tank pump speed ramps up, the speed of the wing fuel tank pumps will be higher for a short period of time and thus the fuel pressure will be higher from the wing fuel tank pumps than from the main fuel tank pump. Since the pumps are fluidically coupled to a common fuel line, fuel will be delivered from the wing fuel tank pumps to the engines. As the main fuel tank pump 22 eventually come up to full speed while at the same time the wing fuel tank pumps 20a, 20b come down in speed, the pressure provided by the main fuel tank pump 22 will exceed the fuel pressure provided by the wing fuel tank pump(s). As a result, fuel delivery to the engines will transition from the wing fuel tanks 16a, 16b to the main fuel tank 18. The method then moves back to step 52 and repeats.

Figure 5:
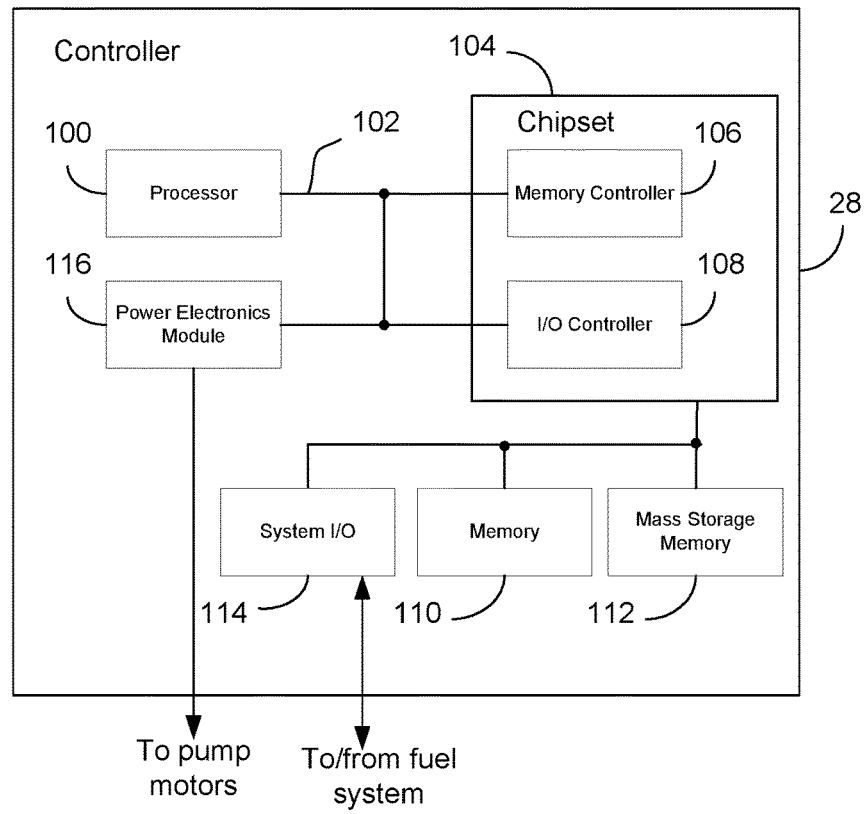
FIG. 5 is a block diagram of an exemplary controller that may be used to implement the method in accordance with the invention.

Referring now to FIG. 5, illustrated is a block diagram of an exemplary controller 28 that may be used to implement the systems, apparatus, and methods described herein. The controller 28 may be included in, be used to implement, be used to control, and/or be used to provide information to one or more of the processes, systems, and configurations described above. As shown in FIG. 5, the controller 28 includes a processor 100 that is coupled to an interconnection bus 102. The processor 100 may be any suitable processor, processing unit or microprocessor. Although not shown in FIG. 5, the controller 28 may be a multi-processor system and, thus, may include one or more additional processors that are identical or similar to the processor 100 and that are communicatively coupled to the interconnection bus 102.

The processor 100 of FIG. 5 is coupled to a chipset 104, which includes a memory controller 106 and an input/output (I/O) controller 108. As is well known, a chipset typically provides input/output (I/O) and memory management functions as well as a plurality of general purpose and/or special purpose registers, timers, etc. that are accessible or used by one or more processors coupled to the chipset 104. The memory controller 106 performs functions that enable the processor 100 (or processors if there are multiple processors) to access a system memory 110, a mass storage memory 112, etc.

The system memory 110 may include any desired type of volatile and/or non-volatile memory such as, for example, static random-access memory (SRAM), dynamic random-access memory (DRAM), flash memory, read-only memory (ROM), etc. The mass storage memory 112 may include any desired type of mass storage device including hard disk drives, optical drives, tape storage devices, etc.

The I/O controller 108 performs functions that enable the processor 100 to communicate, via System I/O, with devices external to the controller, such as pressure switches 44 and other I/O devices. The system I/O 114 may include any I/O interface for monitoring or controlling the aircraft fuel system, including reading data from sensors, such as the pressure feedback sensors 44, as well as any control commands for operating the aircraft fuel system 12. The I/O controller 108 also may perform functions that enable the processor 100 to communicate with other controllers via a network interface, such as, for example, an Ethernet device, an asynchronous transfer mode (ATM) device, an 802.11 device, etc.

While the memory controller 106 and the I/O controller 108 are depicted in FIG. 5 as separate blocks within the chipset 104, the functions performed by these blocks may be integrated within a single semiconductor circuit or may be implemented using two or more separate integrated circuits.

In the exemplary embodiment, the controller 28 also includes a power electronics module 116 for controlling operation of the pumps 20a, 20b and 22. The power electronics module 116 may include power semiconductor devices and the like for driving a motor of each pump based on instructions from the processor 100. In another embodiment, the power electronics module is separate from the controller 28. In this embodiment, the power control module may receive commands from the controller via an analog or serial communication link.

As used herein, the term "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code. Any other kind of implementation of the respective functions which will be described in more detail below may also be understood as a "circuit" in accordance with an alternative embodiment.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

The invention claimed is:

1. A method of controlling a fuel system on an aircraft, the method comprising:
   determining whether the aircraft is above a predetermined altitude;
   when the aircraft is above the predetermined altitude, operating at least one main fuel tank pump associated with a main fuel tank at a high-speed mode and at least one wing fuel tank pump at a low-speed mode to deliver fuel to a fuel consumer only from the main fuel tank until the main fuel tank is depleted; wherein the high-speed mode of the at least one main fuel tank pump corresponds to a nonzero speed and the low-speed mode of the at least one wing fuel tank corresponds to a nonzero speed that is less than the nonzero speed of the at least one main fuel tank pump; and
   when the main fuel tank is depleted, operating the at least one wing fuel tank pump at a high speed mode and the at least one main fuel tank pump at a low-speed mode to deliver the fuel to the fuel consumer only from the at least one wing fuel tank; wherein the high-speed mode of the at least wing fuel tank pump corresponds to a nonzero speed and the low-speed mode of the at least one main fuel tank pump corresponds to a speed that is less than the nonzero speed of the at least one wing fuel tank pump.

2. The method according to claim 1, wherein the at least one main fuel tank pump and the at least one wing tank fuel pump are fluidically coupled to the same fuel consumer through a common fuel line, and selection of fuel from the main fuel tank or the at least one wing fuel tank is based on a fluid pressure created by the respective fuel tank pumps, the pressure created by each fuel tank pump corresponding to a speed of the respective fuel tank pump.

3. The method according to claim 1, wherein selectively supplying fuel comprises, when the aircraft is below the predetermined altitude, turning off the at least one main fuel tank pump and operating the at least one wing fuel tank at the high-speed mode corresponding to a nonzero speed to deliver the fuel to the fuel consumer only from the at least one wing fuel tank.

4. The method according to claim 1, further comprising turning off the at least one main fuel tank pump upon the fuel in the main fuel tank being depleted.

5. An aircraft fuel system for an aircraft, comprising:
   a main fuel tank including at least one main fuel tank pump;
   a first wing fuel tank including at least one first wing fuel tank pump; and
   a controller operably coupled to the at least one main fuel tank pump and the at least one first wing fuel tank pump, the controller configured to:
      determine whether the aircraft is above a predetermined altitude;
      when the aircraft is above the predetermined altitude, operate at least one main fuel tank pump associated with a main fuel tank at a high-speed mode and at least one wing fuel tank pump at a low-speed mode to deliver fuel to a fuel consumer only from the main fuel tank until the main fuel tank is depleted; wherein the high-speed mode of the at least one main fuel tank pump corresponds to a nonzero speed and the low-speed mode of the at least one wing fuel tank corresponds to a nonzero speed that is less than the nonzero speed of the at least one main fuel tank pump; and
      when the main fuel tank is depleted, operate the at least one wing fuel tank pump at a high speed mode and the at least one main fuel tank pump at a low-speed mode to deliver the fuel to the fuel consumer only from the at least one wing fuel tank; wherein the high-speed mode of the at least wing fuel tank pump corresponds to a nonzero speed and the low-speed mode of the at least one main fuel tank pump corresponds to a speed that is less than the nonzero speed of the at least one wing fuel tank pump.

6. The aircraft fuel system according to claim 5, wherein the at least one main fuel tank pump and the at least one first wing fuel tank pump are fluidically coupled to the same fuel consumer through a common fuel line, wherein selection of fuel from the main fuel tank or the at least one wing fuel tank is based on a fluid pressure created by the respective fuel tank pumps, the pressure created by each fuel tank pump corresponding to a speed of the respective fuel tank pump.

7. The aircraft fuel system according to claim 5, wherein the at least one main fuel tank pump and the at least one first wing fuel tank pump comprise a pump having the same specifications.

8. The aircraft fuel system according to claim 5, wherein the at least one main fuel tank pump and the first wing fuel tank pump each have the same physical dimensions and the same performance characteristics.

9. The aircraft fuel system according to claim 5, wherein the at least one fuel consumer comprises a first fuel consumer and a second fuel consumer, further comprising a first fuel line coupling the at least one main fuel tank pump and the at least one first wing fuel tank pump to the first fuel consumer, and a second fuel line coupling the at least one main fuel tank pump and the at least one second wing fuel tank pump to the second fuel consumer.

10. The aircraft fuel system according to claim 9, wherein the at least one main fuel tank pump comprises a first main fuel tank pump and a second main fuel tank pump, further comprising a cross-feed valve fluidically coupling the first main fuel tank pump to the second main fuel tank pump.

11. The aircraft fuel system according to claim 5, wherein the fuel consumer comprises a jet engine or an auxiliary power unit.

12. The aircraft fuel system according to claim 5, wherein the controller is configured to, when the aircraft is below the predetermined altitude, turn off the at least one main fuel tank pump and operate the at least one wing fuel tank at the high-speed mode corresponding to a nonzero speed to deliver the fuel to the fuel consumer only from the at least one wing fuel tank.

13. The aircraft fuel system according to claim 5, wherein the controller is configured to turn off the at least one main fuel tank pump upon the fuel in the main fuel tank being depleted.

14. A method of controlling a fuel system on an aircraft, the method comprising:
   simultaneously operating a wing fuel tank pump associated with a wing fuel tank fluidically coupled to an aircraft engine at a first nonzero operational speed and a main fuel tank pump associated with a main fuel tank fluidically coupled to the aircraft engine at a second nonzero speed that is different than the first nonzero operational speed to selectively deliver fuel to the aircraft engine solely from the wing fuel tank or solely from the main fuel tank.

15. The method according to claim 14, wherein the first nonzero operational speed is higher than the second nonzero operational speed such that fuel is delivered to the aircraft engine solely from the wing fuel tank.

16. The method according to claim 15, further comprising increasing the second nonzero operational speed to a nonzero operational speed that is higher than the first nonzero operational speed to override the wing fuel tank pump with the main fuel tank pump such that the fuel is delivered to the aircraft engine solely from the main fuel tank.

17. The method according to claim 16, wherein increasing the second nonzero operational speed to a nonzero operational speed that is higher than the first nonzero operational speed to override the wing fuel tank pump with the main fuel tank pump such that the fuel is delivered to the aircraft engine solely from the main fuel tank occurs when the aircraft is above a predetermined altitude.

18. The method according to claim 16, further comprising maintaining override of the wing fuel tank pump by the main fuel tank pump until the main fuel tank is depleted.

19. The method according to claim 18, further comprising turning off the main fuel tank upon the fuel in the main fuel tank being depleted.

20. The method according to claim 15, further comprising, when the aircraft is below a predetermined altitude, turning off the main fuel tank pump and operating the wing fuel tank pump at the first nonzero operational speed such that the fuel is delivered to the aircraft engine solely from the wing fuel tank.

* * * * *